(12) United States Patent
Bennett, Sr. et al.

(10) Patent No.: US 8,025,117 B2
(45) Date of Patent: Sep. 27, 2011

(54) POWER AXLE FOR A COMMERCIAL VEHICLE

(76) Inventors: Lawrence R. Bennett, Sr., Mount Vernon, WA (US); Carol L. Bennett, Mount Vernon, WA (US)

(\*) Notice: Subject to any disclaimer, the term of this patent is extended or adjusted under 35 U.S.C. 154(b) by 357 days.

(21) Appl. No.: 12/380,868

(22) Filed: Mar. 5, 2009

(65) Prior Publication Data

US 2010/0224430 A1 Sep. 9, 2010

(51) Int. Cl.
*B60K 1/00* (2006.01)
(52) U.S. Cl. .................... 180/65.51; 180/65.1
(58) Field of Classification Search ............... 180/65.21, 180/65.22, 65.26, 65.285, 65.51, 165; *B60K 1/00, B60K 7/00, 26/00, 35/00, 37/00*
See application file for complete search history.

(56) References Cited

U.S. PATENT DOCUMENTS

| | | | | |
|---|---|---|---|---|
| 5,923,096 A * | 7/1999 | Manak | | 307/10.1 |
| 6,059,064 A * | 5/2000 | Nagano et al. | | 180/243 |
| 6,095,268 A * | 8/2000 | Jones, Jr. | | 180/6.5 |
| 6,205,379 B1 * | 3/2001 | Morisawa et al. | | 701/22 |
| 6,225,713 B1 | 5/2001 | Hattori | | |
| 6,540,035 B2 * | 4/2003 | Nagano et al. | | 180/65.21 |
| 6,580,188 B2 * | 6/2003 | Katagiri et al. | | 310/67 A |
| 7,017,696 B2 | 3/2006 | Pal | | |
| 7,122,979 B2 * | 10/2006 | Wilton et al. | | 318/400.09 |
| 7,271,555 B1 * | 9/2007 | Ciccone | | 318/139 |
| 7,284,628 B2 | 10/2007 | Pal | | |
| 7,291,944 B2 | 11/2007 | Wilt, Jr. | | |
| 7,325,638 B1 * | 2/2008 | Belloso | | 180/69.6 |
| 7,332,881 B2 * | 2/2008 | Clark et al. | | 318/139 |
| 7,560,882 B2 * | 7/2009 | Clark et al. | | 318/139 |
| 7,681,676 B2 * | 3/2010 | Kydd | | 180/65.21 |
| 7,825,616 B2 * | 11/2010 | Clark et al. | | 318/139 |
| 7,836,987 B2 * | 11/2010 | Aoki | | 180/65.265 |
| 7,841,433 B2 * | 11/2010 | Soliman et al. | | 180/65.265 |
| 2001/0008192 A1 * | 7/2001 | Morisawa | | 180/197 |
| 2002/0007974 A1 * | 1/2002 | Nagano et al. | | 180/65.2 |
| 2002/0157882 A1 * | 10/2002 | Kubo et al. | | 180/65.3 |
| 2003/0085063 A1 * | 5/2003 | Wakitani et al. | | 180/65.1 |
| 2003/0201692 A1 | 10/2003 | Chen | | |
| 2005/0097788 A1 * | 5/2005 | Wakitani et al. | | 37/348 |
| 2005/0133285 A1 * | 6/2005 | Shimizu | | 180/65.2 |
| 2006/0108956 A1 * | 5/2006 | Clark et al. | | 318/139 |
| 2008/0121443 A1 * | 5/2008 | Clark et al. | | 180/65.1 |
| 2008/0257620 A1 * | 10/2008 | Poulsen | | 180/65.2 |
| 2009/0259356 A1 * | 10/2009 | Clark et al. | | 701/22 |

\* cited by examiner

*Primary Examiner* — J. Allen Shriver, II
*Assistant Examiner* — Jacob Meyer
(74) *Attorney, Agent, or Firm* — Theresa M. Seal

(57) ABSTRACT

A power axle for assisting an automotive vehicle in ascending and descending steep slopes and grades includes an electromagnetic motor mounted to one floating axle of the vehicle, a junction box mounted to and electrically connected to the electromagnetic motor, a DC/AC power inverter mounted to the cab interposed between and for electrically interconnecting the vehicle's battery to the electromagnetic motor for powering the motor from the battery and control switches mounted on the dashboard and which include an on/off switch and a speed control dial for regulating and controlling the interaction and engagement of the electromagnetic motor with the floating axle of the vehicle.

1 Claim, 4 Drawing Sheets

POWER AXLE FOR A COMMERCIAL VEHICLE

FIELD OF THE INVENTION

The present invention pertains to power assists for commercial vehicles, and especially for semi-truck trailers, and more particularly pertains to a power axle that assists the semi-truck trailer in more efficiently traversing steep hills and grades on the incline and decline.

BACKGROUND OF THE INVENTION

Private, public, and commercial automotive vehicles of all types—delivery trucks, semi-truck trailers, tractor-trailers, buses, recreational vehicles, construction equipment, etc.—are all expensive to operate and maintain, especially in the difficult contemporary economic conditions. Regular mechanical maintenance costs, fuel costs, permits, licensing, etc., make the owning and operation of such vehicles an expensive proposition. One of the driving conditions that causes considerable wear on the vehicle occurs during the ascent of the vehicle up a steep slope, grade, hill or incline of the descent of the vehicle down the steep slope, grade, hill or incline. Such conditions occur when the vehicle is traversing, for example, mountainous terrain. When ascending the slope extra power must be expended in pulling the vehicle up the ascent while, on the other hand, during the descent the operator must continually apply the brakes (or brake), thereby resulting in increased wear and fatigue on the entire braking system. Thus, it would be desirable to conceive of a device or apparatus that assists in the ascent and descent of the vehicle thereby saving maintenance and fuel costs and also reducing the strain and fatigue to the vehicle's mechanical systems, primarily the braking system.

For example, the Hattori et al. patent (U.S. Pat. No. 6,225,713 B1) discloses an electromagnetic force motor and also a method of manufacturing the force motor.

The Chen patent (U.S. patent no. 2003/0201692 A1) discloses a magnet motor device that includes a power perpetual magnet for generating repelling torque and which can be coupled to the driven motor of a bicycle, motorcycle, or car.

The Pal patent (U.S. Pat. No. 7,017,696 B2) discloses a two-wheeled electric vehicle with a ring like, large, powered parallel wheels with at least one of the ring like wheels being driven by a large toroidal electric motor.

The Pal patent (U.S. Pat. No. 7,284,628 B2) discloses a vehicle with a zero turning radius employing a minimum of two generally parallel matching annular wheels mounted with independent pneumatic toroidal suspensions fixed coaxially on a chassis.

The Wilt, Jr. et al. patent (U.S. Pat. No. 7,291,944 B2) discloses an electromagnetic-engine that includes an inner motor and an outer motor with both motors having magnets of opposite polarity mounted thereon.

Nonetheless, despite the ingenuity of the above devices, there remains a need for a power axle that can be factory installed or retrofitted to floating axle of a commercial vehicle such as semi-truck trailer.

SUMMARY OF THE INVENTION

The present invention comprehends an improvement for automotive vehicles, private, public and commercial, ranging from travel trailers to over-the-road vehicles such as tractor trailers and semi-truck trailers for reducing fuel and maintenance costs by easing the descent and assisting in the ascent of such vehicles when traversing slopes, inclines, steep grades and mountain passes.

The present invention comprehends a power axle that can be factory installed or retrofitted to such desired private, public and commercial vehicles and includes an electromagnetic motor, preferably of between 50 and 75 horsepower, mounted to the rear floating axle of the automotive vehicle. The power axle is actuated from the cab of the vehicle to assist in pushing the vehicle up grades, slopes and inclines, and retards—creates a drag effect—as the vehicle descends the steep slope, hill, grade, or incline for maintaining a slow constant speed of descent and thereby saving on the brakes. An electrical junction box is mounted to the electromagnetic motor and the junction box is electrically interconnected to the dashboard, specifically to controls mounted on the dashboard and that include a manually engageable on/off switch and a manually adjustable speed control dial. If needed a DC/AC power inverter can be interposed between the dashboard-mounted controls and the electromagnetic motor for making the appropriate direct current to alternating current conversions. It should be noted that the power for the electromagnetic motor would be supplied from the battery of the vehicle. Also, the required power cables will extend from the dashboard-mounted controls to the DC/AC power inverter and thence to the junction box mounted to, and electrically interconnected with, the electromagnetic motor.

It is an objective of the present invention to provide a powered axle for a commercial vehicle that makes it easier for the commercial vehicle to climb inclines, slopes and hills, and also regulates the speed of the commercial on steep slopes.

It is another objective of the present invention to provide a powered axle for a commercial vehicle that will make commercial vehicles, such as semi-truck trailers and tractor-trailers, safer to drive.

It is yet another objective of the present invention to provide a powered axle for a commercial vehicle that gives the vehicle better fuel efficiency.

It is a further objective of the present invention to provide a powered axle for a commercial vehicle that provides the owner with substantial maintenance cost savings.

It is a still yet further objective of the present invention to provide a powered axle for a commercial vehicle wherein the power for the electromagnetic motor that is mounted to the floating axle is derived from the battery of the vehicle.

Another objective of the present invention is to provide a powered axle for a commercial vehicle wherein the powered axle and the accompanying equipment—dc-ac power inverter and electromagnetic motor—can be sized to accommodate various types of vehicles such as travel trailers.

Yet another objective of the present invention is to provide a powered axle for a commercial vehicle wherein the powered axle—and accompanying equipment—would save the vehicle's brakes when used as a drag when the vehicle descends a slope or incline.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Figure 1:
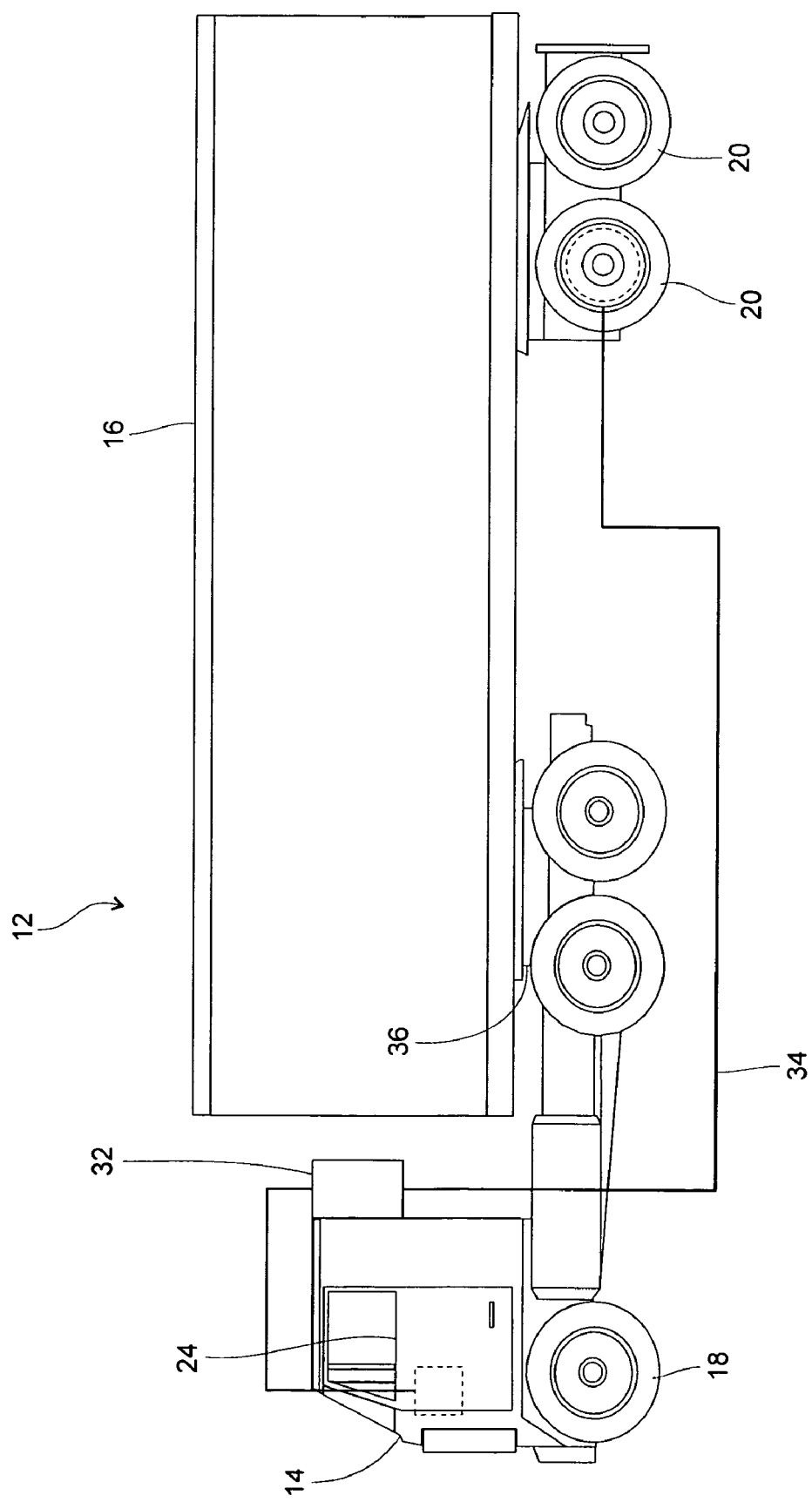
FIG. 1 is a side elevational view of the powered axle for a commercial vehicle for easy the ascent and descent of the vehicle up and down hills, slopes and inclines.

Illustrated in FIGS. 1-6 is power axle apparatus 10 that can either be retrofitted to or factory installed to an automotive vehicle such as a recreational vehicle, any type of commercial delivery truck, construction and machinery equipment and vehicles, semi-truck trailers, tractor-trailers, etc.; and for representative purposes the vehicle 12 is a semi-truck trailer. The semi-truck trailer 12 includes a driver's compartment or cab 14 for the driver/operator and a trailer 16 attached to the cab 14 (the various electrical/pneumatic hook-ups and cables are omitted for clarity). Recreational vehicles would not include a separate cab and thus the dashboard, steering wheel and operational controls would be located in the integral front driver's compartment. The cab 14 includes sets of front cab tires 18 and the trailer 16 includes one or more sets of rear tires 20 with each set of rear tires 20 being joined by floating axles 22. The semi-truck trailer 12 shown in FIGS. 1, 2 and 6 includes two sets of rear tires 20 each of which are interconnected by a rear free or floating axle 22. The cab 14 includes an interior 24 for the driver/operator, and the cab interior 24 includes a dashboard 26 with several controls for the power axle apparatus 10 located thereon within easy reach and manipulation by the driver/operator, and which will be hereinafter further described.

Figure 2:
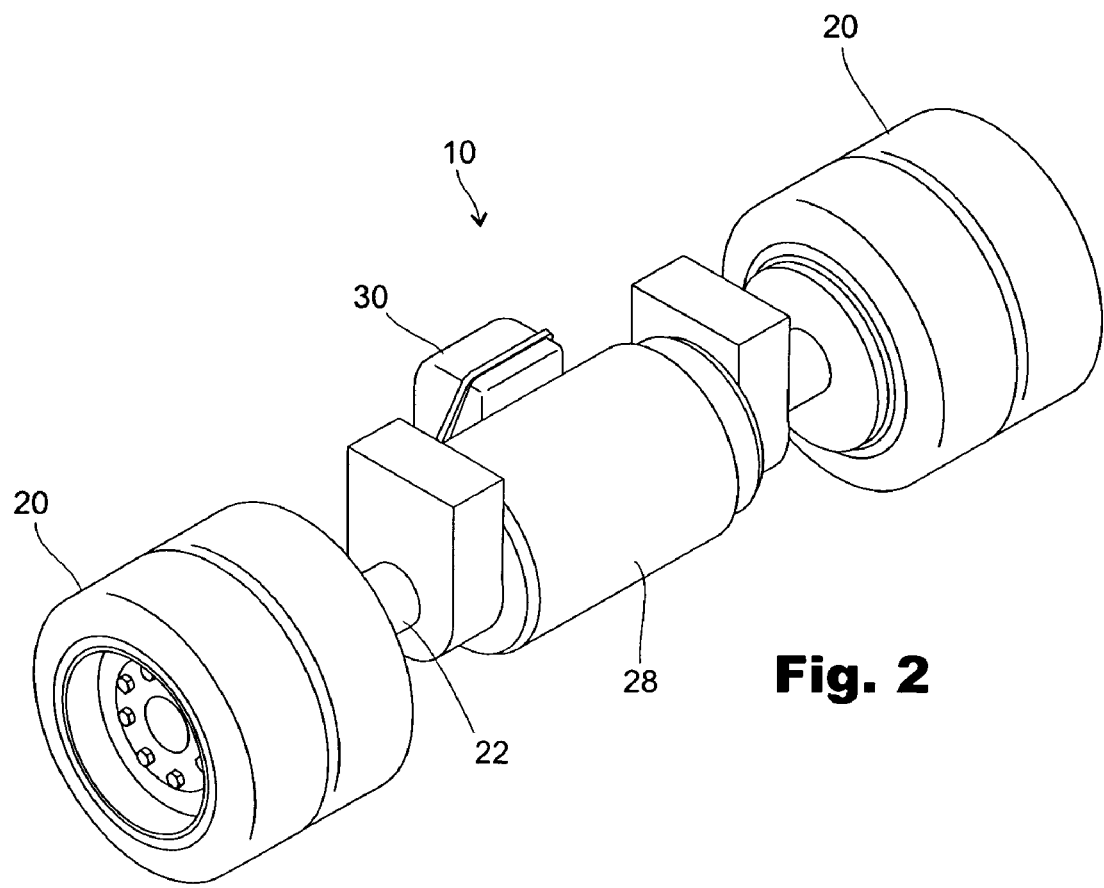
FIG. 2 is a perspective view of the powered axle for a commercial vehicle that illustrates the floating axle and the junction box and electromagnetic motor mounted thereon.
Figure 3:
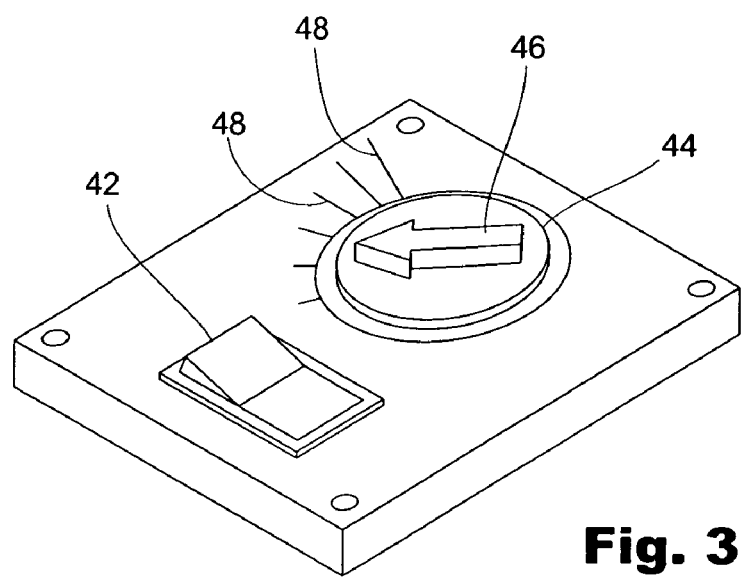
FIG. 3 is a perspective view of the powered axle for a commercial vehicle that illustrates the speed control dial and the on/off switch for controlling and regulating the powered axle arrangement.
Figure 4:
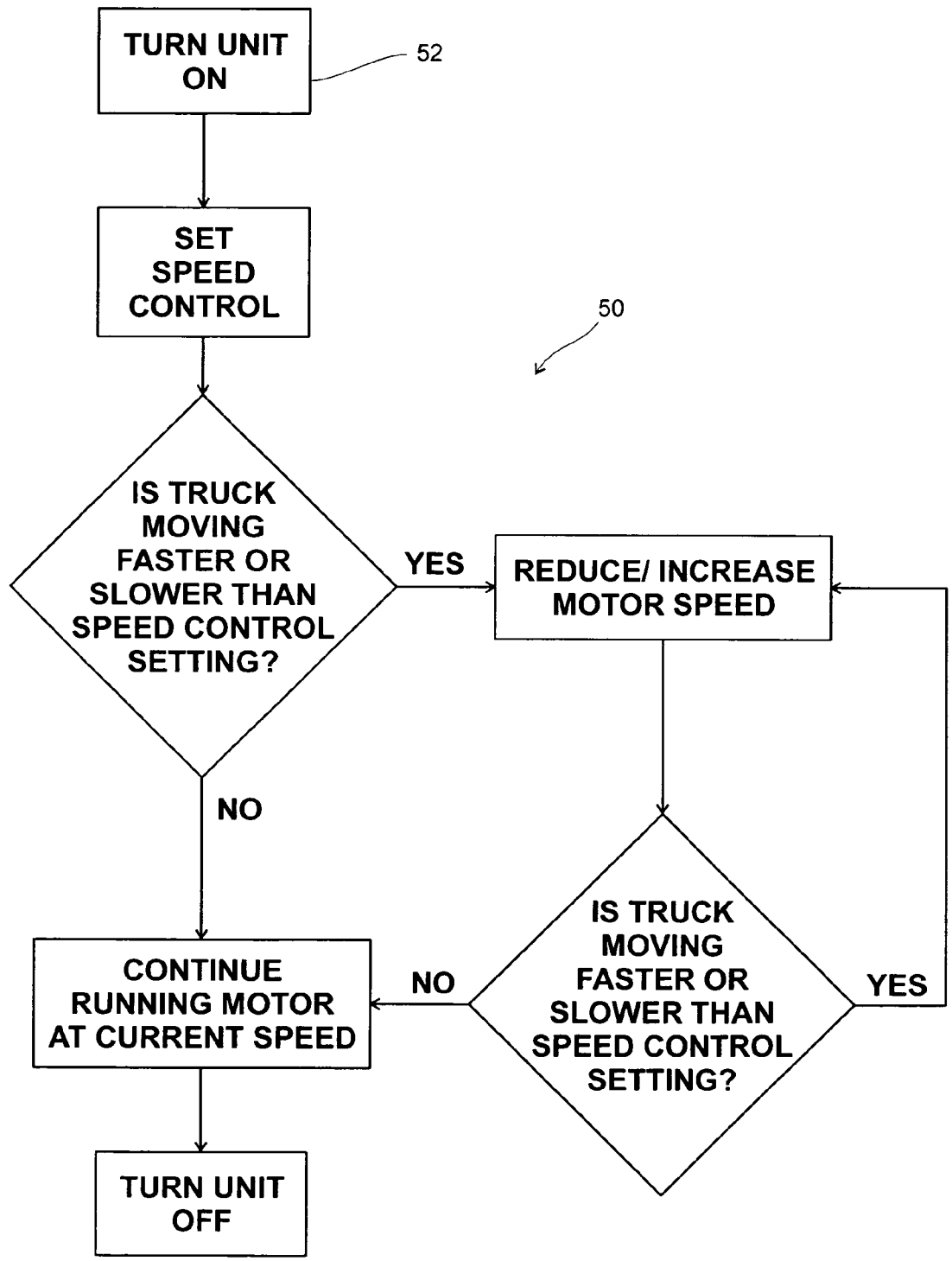
FIG. 4 is a schematic view of the powered axle for a commercial vehicle that illustrates the operational steps for engaging and disengaging the powered axle.
Figure 5:
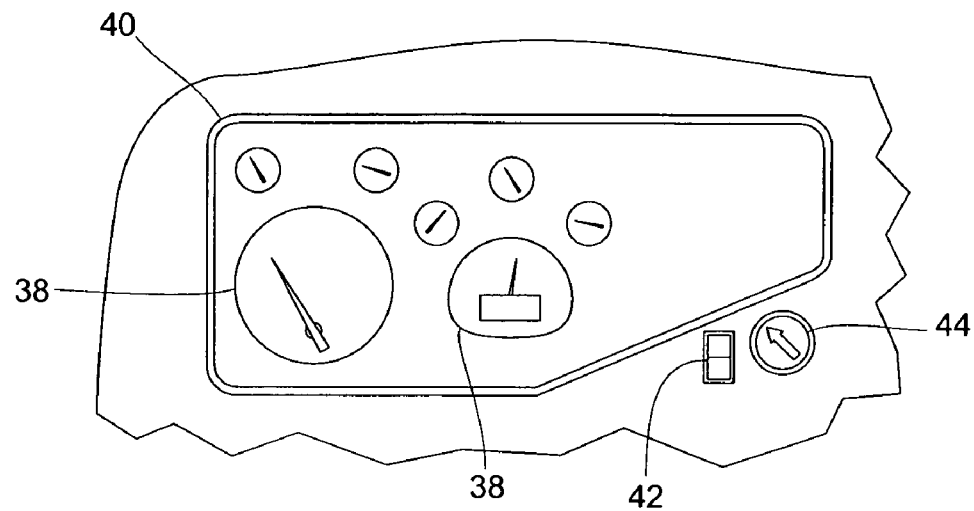
FIG. 5 is a front elevational view of the powered axle for a commercial vehicle that illustrates a representative dashboard for the commercial vehicle and the location of the on/off switch and the speed control dial.
Figure 6:
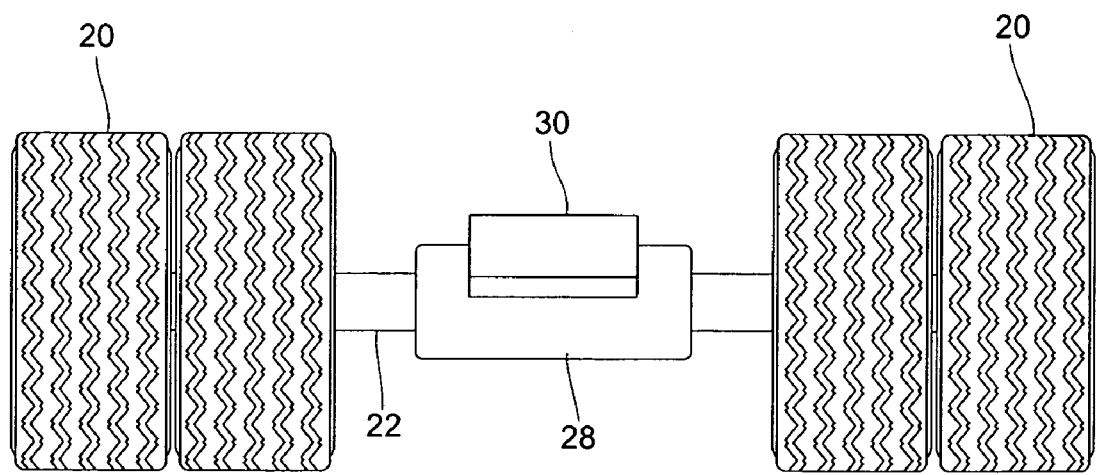
FIG. 6 is a front elevational view of the powered axle for a commercial vehicle that illustrates the mounting of the junction box to the electromagnetic motor and the disposition of the electromagnetic motor relative to the floating axle and the wheels of the vehicle.

Thus, illustrated in FIGS. 2 and 4 is an electromagnetic motor 28 that is mounted to and on one floating axle 22 of the semi-truck trailer 12 thus converting the floating axle 22 to a power axle. The electromagnetic motor 28 is selectively actuated to assist the vehicle 12 in climbing the incline or grade and then descending down the incline, grade, slope, or hill. The electromagnetic motor 28 is mounted circumjacent the floating axle 22 for selectively and physically contacting and engaging the axle 22 to assist in the vehicle's 12 ascent and maintain a slow and constant vehicle speed during the descent. The electromagnetic motor 28 can be sized for the appropriate vehicle with a horsepower of 50 to 75 being one standard power range with lesser horsepower motors adaptable for smaller vehicles such a recreational vehicles. A junction box 30 is mounted to and interconnected with the electromagnetic motor 28 for regulating the proper voltage/amperage to the electromagnetic motor 28 (for clarity the electrical wiring is not shown).

As shown in FIG. 1, a DC/AC power inverter 32 can be mounted to the rear of the cab 14 and is electrically interconnected to the junction box 30 by the appropriate electrical cables/wiring 34. The electrical cables/wiring 34 extends from the rear of the cab 14, past the hitch 36 and along the underside of the trailer 16 to the junction box 30. A control means is located within the cab 14 adjacent to the primary instruments 38 on the dashboard 40. The control means includes a manually operable on/off switch 42 and a speed control dial 44 with a manually adjustable speed control arrow 46 and regularly spaced gradations 48. The speed control arrow 46 is manually adjustable for setting the speed of the motor 28 from a range of speeds extending from low speed to a high speed. This sets the speed (rotational) with which the electromagnetic motor 28 engages the floating axle 22 for either assisting in pushing the vehicle 12 up the incline or slowing the descent of the vehicle 12 as it comes down the incline, slope, grade, hill, etc.

In operation the power axle apparatus 10 will be used to push the vehicle 12 up the hill while the semi-truck trailer 12 is simultaneously pulling thereby saving on fuel; then as the descent commences the driver will set the speed control dial 44 to the proper setting to slow the vehicle's 12 descent. The engagement and action of the electromagnetic motor 28 with respect to the floating axle 22 creates a drag effect on the vehicle 12 during the descent thereby holding the semi-truck trailer 12 at a constant slow speed saving on the brakes and realizing overall savings on the maintenance costs; and also providing considerable cost savings for the driver/operator/owner.

More specifically, with reference to the representative flowchart/schematic 50 of FIG. 4 the operational steps are set forth commencing with the turn unit on step 52. The speed control is set by manually adjusting the speed control dial 44 to the desired speed. It should be noted that the speed control dial can be electronically programmed with the desired speed gradations thus requiring the driver to only push a speed control button until the desired speed appears on a small screen or monitor such as a LCD screen. The decision on whether to increase or decrease motor speed would be determined by evaluating whether the vehicle 12 was moving slower or faster than the particular speed control setting. If the speed of the vehicle 12 is congruent with the particular speed at which the electromagnetic motor 28 is running then the driver/operator simply maintains the current speed of the motor 28. When the vehicle 12 commences travel on a flat or level stretch of highway or roadway the power axle apparatus 10 can be disengaged by turning the on/off switch 42 to the off position.

While a preferred embodiment has been shown and described, numerous modifications, alterations, and variations are practicable and possible by those skilled in the art while still remaining within the scope of the invention and the ambit of the accompanying claims.

We claim:

1. A power axle apparatus for assisting an automotive vehicle having a driver's compartment, at least one front axle and one rear axle in ascending a slope, hill, incline and grade, and descending from the slope, hill, incline and grade, comprising: an electromagnetic motor mounted onto the rear axle and which is selectively actuated for engaging the rear axle during the ascent and the descent of the automotive vehicle; a junction box mounted to the electromagnetic motor and electrically interconnected therewith; a DC/AC power inverter interposed between the battery of the automotive vehicle and the junction box and electrically interconnected therewith for providing the electrical current conversions; an on/off switch mounted on the dashboard of the automotive vehicle for selectively actuating the electromagnetic motor; a speed control dial mounted on the dashboard of the automotive vehicle for setting the speed of the electromagnetic motor relative to the speed of the automotive vehicle; and wherein as the automotive vehicle commences the ascent the electromagnetic motor is actuated for engaging the rear axle and the speed control dial is set to assist the automotive vehicle in pushing the automotive vehicle during the ascent and as the automotive vehicle commences the descent the speed control dial is adjusted to slow the descent of the vehicle so that the descent of the vehicle is maintained at a constant slow speed.

* * * * *